(12) United States Patent
Kennedy

(10) Patent No.: US 12,038,099 B1
(45) Date of Patent: Jul. 16, 2024

(54) VALVE ACTUATOR ASSEMBLY

(71) Applicant: MCWANE, INC., Birmingham, AL (US)

(72) Inventor: Paul Kennedy, Horseheads, NY (US)

(73) Assignee: MCWANE, INC., Birmingham, AL (US)

( * ) Notice: Subject to any disclaimer, the term of this patent is extended or adjusted under 35 U.S.C. 154(b) by 0 days.

(21) Appl. No.: 18/343,022

(22) Filed: Jun. 28, 2023

(51) Int. Cl.
 *F16K 31/528* (2006.01)
 *F16K 1/22* (2006.01)

(52) U.S. Cl.
 CPC .......... *F16K 31/5282* (2013.01); *F16K 1/221* (2013.01)

(58) Field of Classification Search
 CPC ..... F16K 31/5282; F16K 31/535; F16K 1/221
 See application file for complete search history.

(56) References Cited

U.S. PATENT DOCUMENTS

| | | | | |
|---|---|---|---|---|
| 2,908,182 A * | 10/1959 | Bacchi | ................... | F16K 31/502 74/89.45 |
| 3,877,677 A * | 4/1975 | Daghe | ................... | F16K 31/502 251/285 |
| 7,303,180 B1 * | 12/2007 | O'Shea | ................. | F16K 31/502 251/285 |
| 2011/0024659 A1 * | 2/2011 | Kim | ........................ | F16K 1/221 251/305 |
| 2017/0232285 A1 * | 8/2017 | Magee | .................... | F16K 1/221 137/554 |

* cited by examiner

*Primary Examiner* — Kenneth Rinehart
*Assistant Examiner* — Nicole Gardner
(74) *Attorney, Agent, or Firm* — Brown & Michaels, PC

(57) ABSTRACT

A butterfly valve actuator assembly includes a platform having a first platform support and a second platform support. A stem extends through a first opening of the first platform support and through a second opening of the second platform support. The stem has a first externally threaded portion and a second externally threaded portion, the first externally threaded portion and the second externally threaded portion between the first platform support and the second platform support. A pin nut has a body and a pin, the body having a first internally threaded portion threadingly engaged with the first externally threaded portion. A collar nut can have a second internally threaded portion that can be threadingly engaged with the second externally threaded portion. A lock nut can be coupled to the stem between the pin nut and the first platform support.

22 Claims, 6 Drawing Sheets

Fig. 3
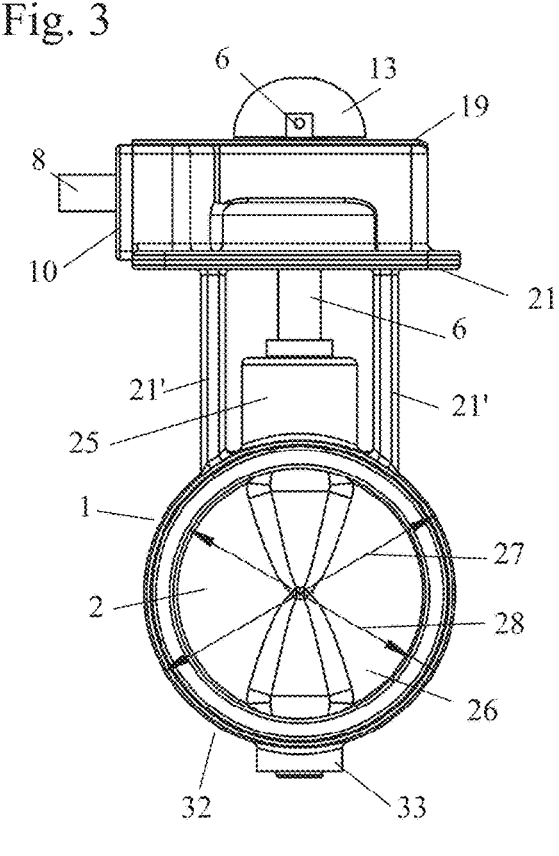
Fig. 4
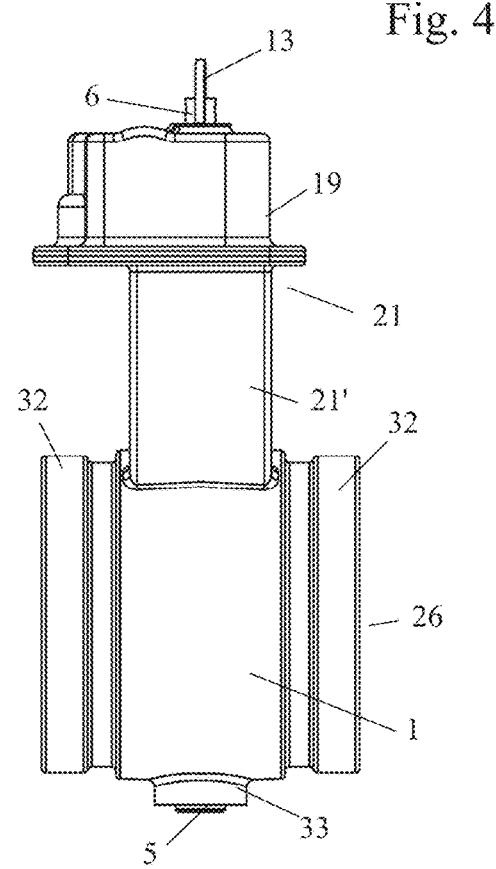
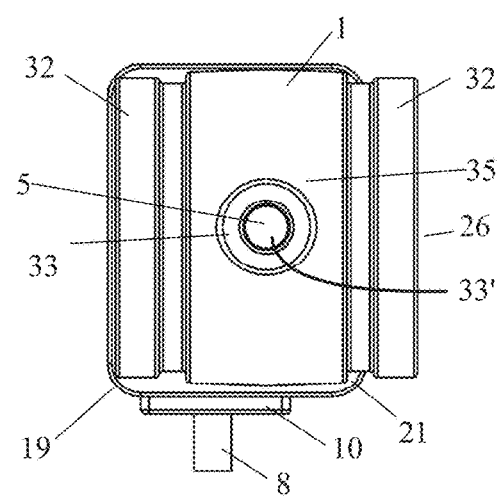
Fig. 5

VALVE ACTUATOR ASSEMBLY

BACKGROUND OF THE INVENTION

Field of the Invention

The invention pertains to the field of valves. More particularly, the invention pertains to a valve actuator assembly.

Description of Related Art

A butterfly valve regulates the flow of fluid. The valve has a body with a passage, through which fluid can be allowed to flow, or through which fluid flow can be blocked by a closing mechanism. The closing mechanism is a disk in the passage that rotates from an open position parallel with an axis of the valve body to a closed position perpendicular with the axis of the valve body. An actuator box attached to the valve body encases internal components that facilitate rotation of the disk between the open position and the closed position. In conventional butterfly valves, the actuator box has four sides integral with a base, and top plate to enclose the remaining side. The base and four sides of the actuator box, being integral with the body of the valve, are formed from a material such as iron or steel, which are more substantial than, for example, aluminum. To meet certain industry standards, the body of the valve must be made from a more substantial material like iron or steel in order to better keep the valve open in the case of a fire. The components inside the actuator box can be accessed for maintenance by removing the top plate. Access to the internal components through the space occupied by the top plate is restricted by the four sides integral with the base.

Components inside the actuator box make up an actuator assembly. The actuator assembly includes a threaded stem that rotates on its own axis to move a pin nut along the stem. The pin nut has a pin that engages a Scotch Yoke to rotate a valve shaft, thereby opening and closing the butterfly valve. Operators can apply damaging levels of force in attempts to close or open the butterfly valve.

SUMMARY OF THE INVENTION

A butterfly valve disclosed herein has improved accessibility to the components inside the actuator box, lowered weight, decreased manufacturing cost, and increased manufacturing ease. An actuator assembly for the butterfly valve also improves handling of stress and/or potentially damaging forces applied to mechanical components during operation to adjust the butterfly valve between open and closed positions.

In an embodiment, a butterfly valve actuator assembly includes: a platform having a first platform support and a second platform support, the first platform support having a first opening, the second platform support having a second opening; a stem extending through the first opening and the second opening, the stem having a first externally threaded portion and a second externally threaded portion, the first externally threaded portion and the second externally threaded portion between the first platform support and the second platform support; a pin nut having a body and a pin, the body having a first internally threaded portion threadingly engaged with the first externally threaded portion; and a collar nut having a second internally threaded portion threadingly engaged with the second externally threaded portion.

In another embodiment, a butterfly valve actuator assembly includes: a platform having a first platform support and a second platform support, the first platform support having a first opening, the second platform support having a second opening; a stem extending through the first opening and the second opening, the stem having a first externally threaded portion and a second externally threaded portion, the first externally threaded portion and the second externally threaded portion between the first platform support and the second platform support; a pin nut having a body and a pin, the body having a first internally threaded portion threadingly engaged with the first externally threaded portion; and a lock nut coupled to the stem between the pin nut and the first platform support.

BRIEF DESCRIPTION OF THE DRAWING

FIG. 3 shows an end view of the butterfly valve of FIG. 1.

FIG. 4 shows a side view of the butterfly valve of FIG. 1.

FIG. 5 shows a bottom view of the butterfly valve of FIG. 1.

DETAILED DESCRIPTION OF THE INVENTION

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
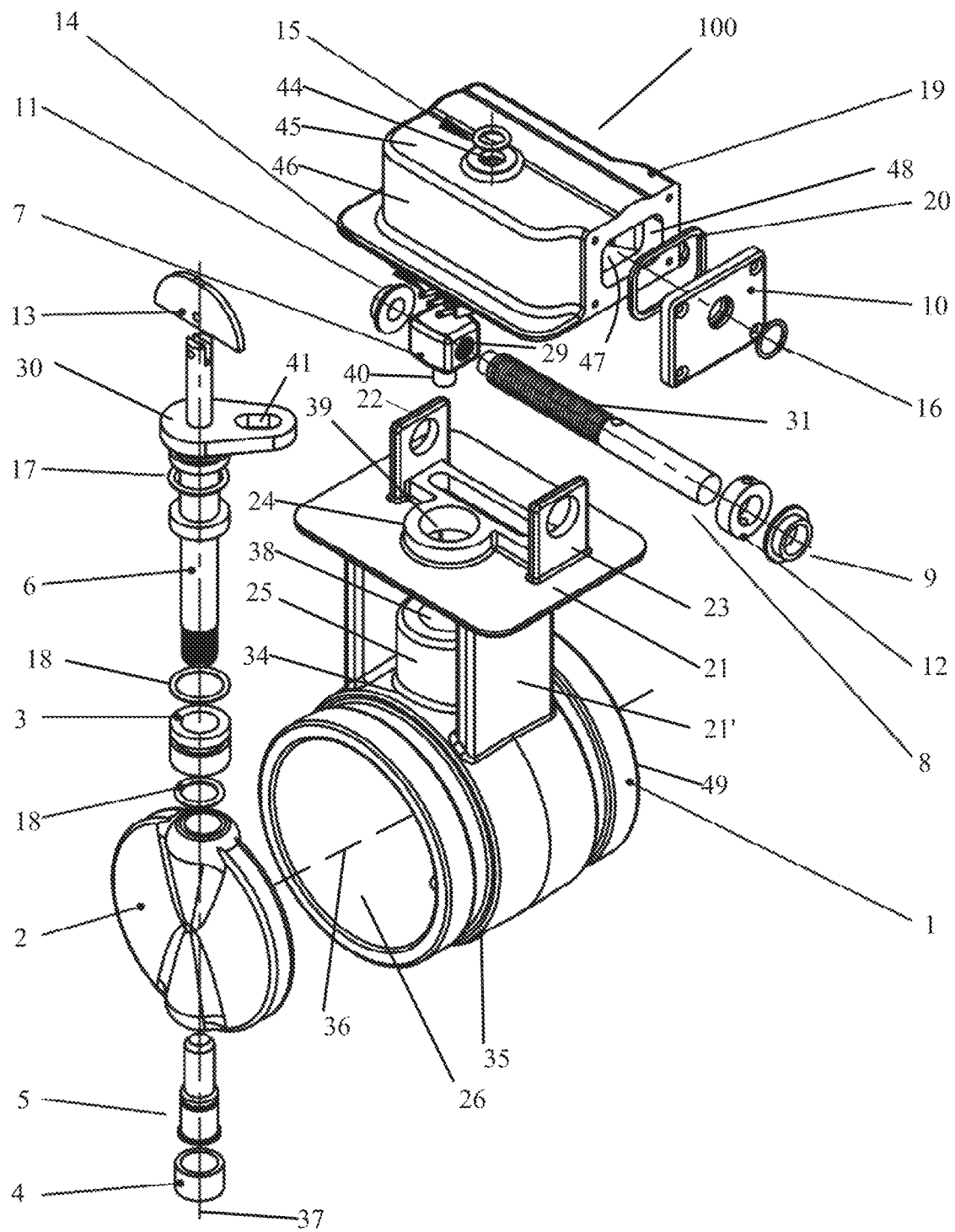
FIG. 1 shows an exploded view of the butterfly valve, according to an embodiment.
Figure 2:
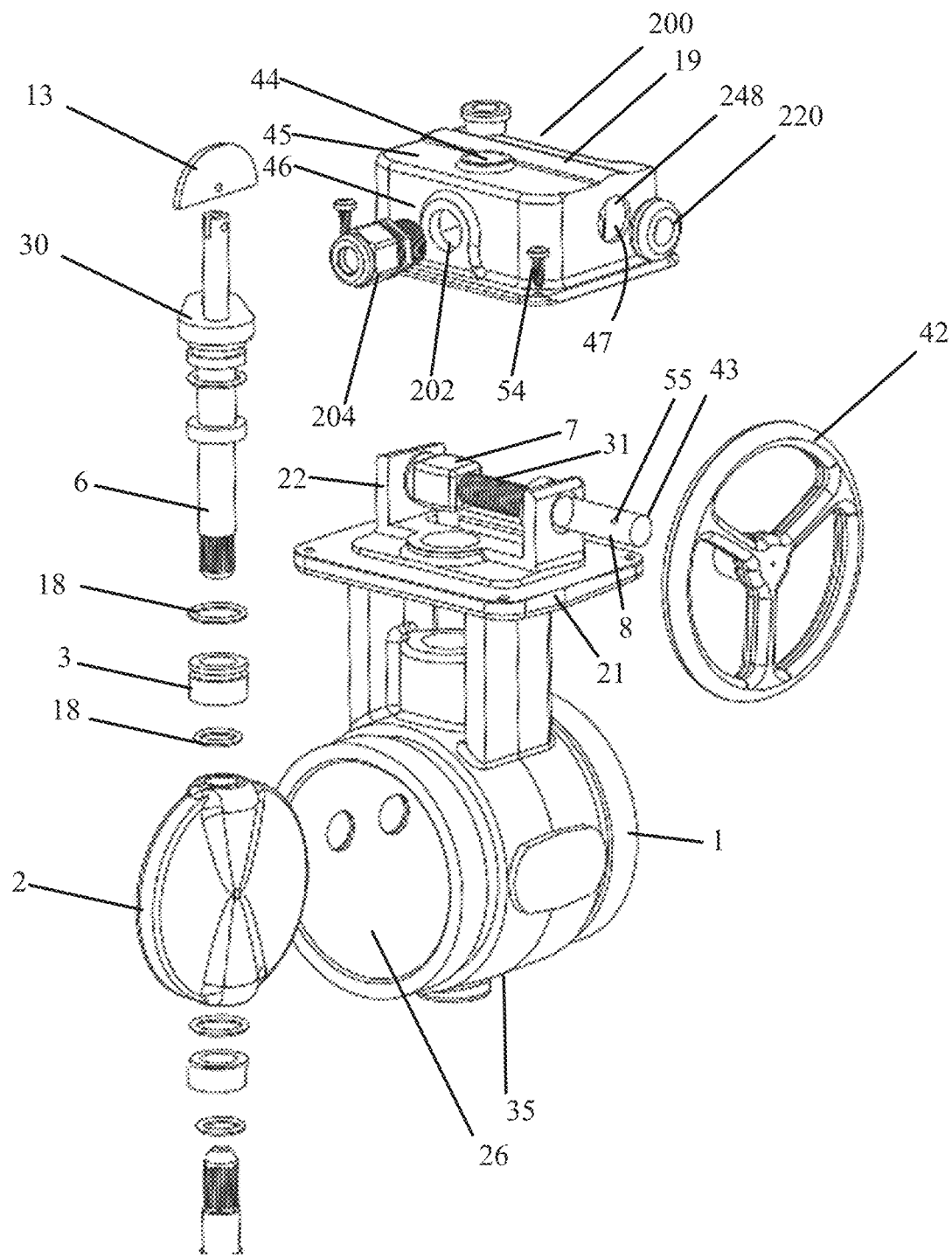
FIG. 2 shows a partially exploded view of a butterfly valve, according to an embodiment.

FIG. 1 shows an exploded view of a butterfly valve 100. FIG. 2 shows a partially exploded view of a second butterfly valve 200. FIG. 3 shows a side view of the valve 100. FIG. 4 shows a view of the valve 100 from the right-hand side of FIG. 1. FIG. 5 shows a view of the valve 100 from the bottom of valve 100. Identical reference numbers are used in all of the figures to refer to the same elements of the valve 100, 200.

Referring to FIGS. 1-5, the valve 100, 200 has a body 1 with a base or platform 21 supported on the body 1 by body supports 21'. The body 1, the body supports 21', and the platform 21 can be formed, e.g., cast, as one integral unit. The body 1, including the body supports 21' and the platform 21 can be formed of iron. Other materials with suitably strong and fire resistant characteristics can alternatively be used. A central passage 26 leads through a fluid conduit 49 of the valve body 1. The fluid conduit 49 has fittings on either end of the passage to permit the valve 100, 200 to be fitted into a pipe or other fluid conduit. These fittings are shown in the drawing as flanges 32 having an inner diameter 27, which is larger than the diameter 28 of the passage 26, although it will be understood that other fittings can be used as needed by the valve application.

The body 1 has an upper bearing case 25 formed on an upper surface or portion 34 of the body 1, a lower bearing case 33 formed on a lower surface or portion 35 of the body 1, and a platform bearing case 24 formed on the platform 21.

A circular disk 2 fits within the passage 26. When the disk 2 is in a fully open position wherein the disk 2 is parallel to an axis 36 of the valve body, fluid can flow through the passage 26 in the body 1 nearly unobstructed. When the disk 2 is rotated to a closed position wherein the disk 2 is perpendicular to the axis 36 of the valve body 1, the disk 2 blocks fluid flow through the passage 26. Intermediate positions of the disk 2 can be used to control flow through the passage 26 between full flow and no flow, as is well known in the art.

The disk 2 is supported and rotated by a lower shaft 5 and an upper shaft 6, which are each fastened to the disk 2 on a rotational axis 37 of the disk. This fastening can be accomplished by screwing threaded ends of lower shaft 5 and upper shaft 6 into mating sockets on the disk 2, or by other means known to the art. The lower shaft 5 is supported within the body 1 by lower bearing 4 fitting within lower bearing case 33, and the upper shaft 6 is supported within the body 1 by upper bearing 3 fitting within upper bearing case 25. O-rings 18 can be provided on either side of the upper bearing 3 to minimize fluid leakage around the bearing 3. The upper shaft 6 passes through the platform 21 through the platform bearing case 24. The upper bearing case 25 and body 1 have an opening 38, and the platform bearing case 24 and platform 21 have an opening 39, the openings 38, 39 aligned and sized to fit around the upper shaft 6. The lower bearing case 33 may have a central opening 33' extending also through the lower portion 35 of the body 1 to permit the lower shaft 5 to extend outside of the body 1 as shown in the drawing.

The platform 21 supports components of an actuator assembly, a valve position indicator assembly, and a removable actuator box cover or hood 19. As part of the actuator assembly, the valve stem 8 is mounted with bushes 9, 11 and lock nut 12 to the platform 21 by platform supports 22, 23. The valve stem 8 has a threaded portion 31, which mates with a threaded portion 29 of a pin nut 7, so that rotation of the valve stem 8 causes linear movement of the pin nut 7 along an axis of the valve stem 8. The valve stem 8 can be rotated automatically, or as illustrated in FIG. 2, manually, such as by rotating a handwheel 42 attached to an end 43 of the valve stem 8. The handwheel 42 can be fastened to the valve stem 8 using conventional methods, such as with a screw through the handwheel into screw hole 55.

A Scotch yoke actuator arm 30 is mounted on the upper shaft 6 at a position above the threaded portion 31 of the stem 8, in some embodiments by casting the Scotch yoke actuator arm 30 with the upper shaft 6. Pin nut 7 has a pin 40 which fits within a slot 41 in the Scotch yoke actuator 30, so that as the valve stem 8 rotates and the pin nut 7 moves linearly, the Scotch yoke actuator arm 30 rotates. As a result, the disk 2 also rotates.

Figure 6:
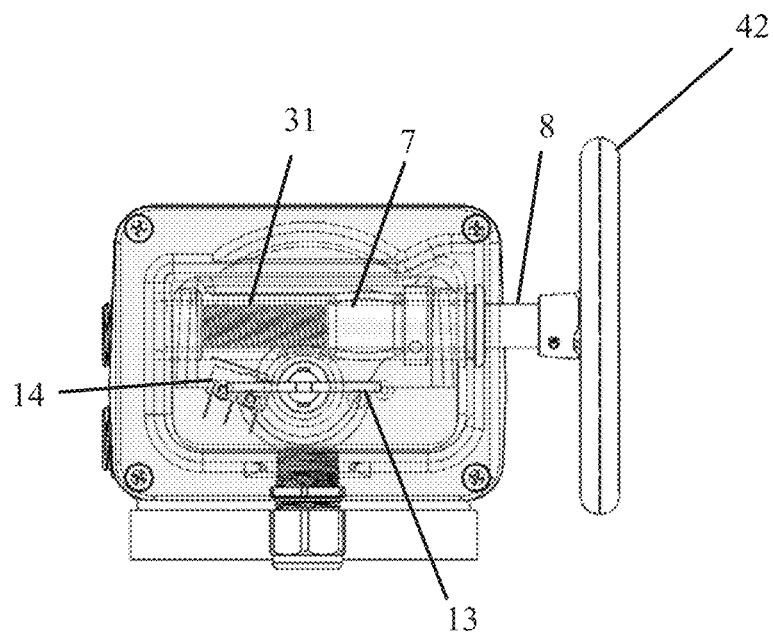
FIG. 6 shows a transparent top view of a limit switch in a closed-circuit position, according to the embodiment of the butterfly valve of FIG. 2.
Figure 7:
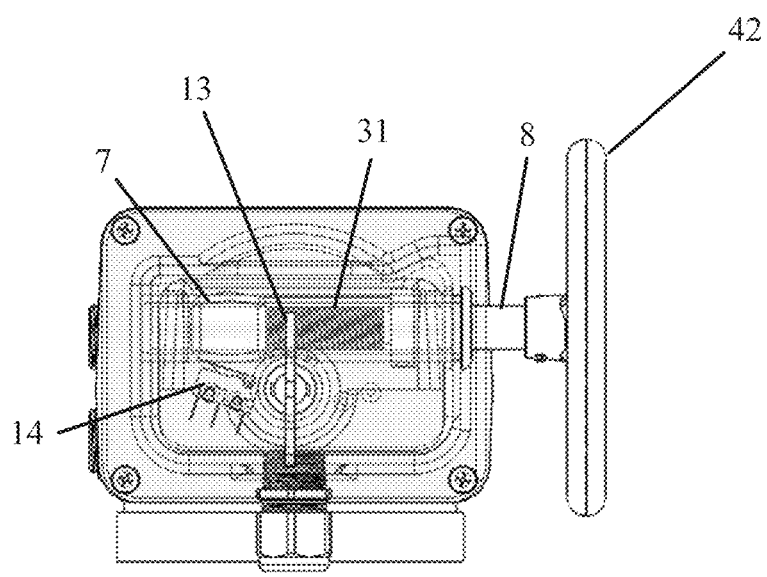
FIG. 7 shows a transparent top view of the limit switch of FIG. 6 in an open-circuit position.

As part of the valve position indicator assembly, rotation of the Scotch yoke actuator arm 30 also operates at least one limit switch 14 for remote indication of the position of the disk 2. FIG. 6 shows a transparent top view of the limit switch 14 in a closed-circuit position, and FIG. 7 shows a transparent top view of the limit switch 14 in an open-circuit position. The pin nut 7 and limit switch 14 can be arranged such that the limit switch 14 is actuated when the valve disk 2 is at either the open position or the closed position, or while the valve disk 2 is between the open and closed positions. Alternatively, separate limit switches 14 can be provided to be operated by the pin nut 7 at each of the open and closed positions. If desired, a flag or indicator 13 can be mounted on the top end of the upper shaft 6 to visually signal the position of the disk 2 to an operator. The upper shaft 6 can extend through an opening 44 in a top side 45 of the actuator box cover 19.

Figure 8:
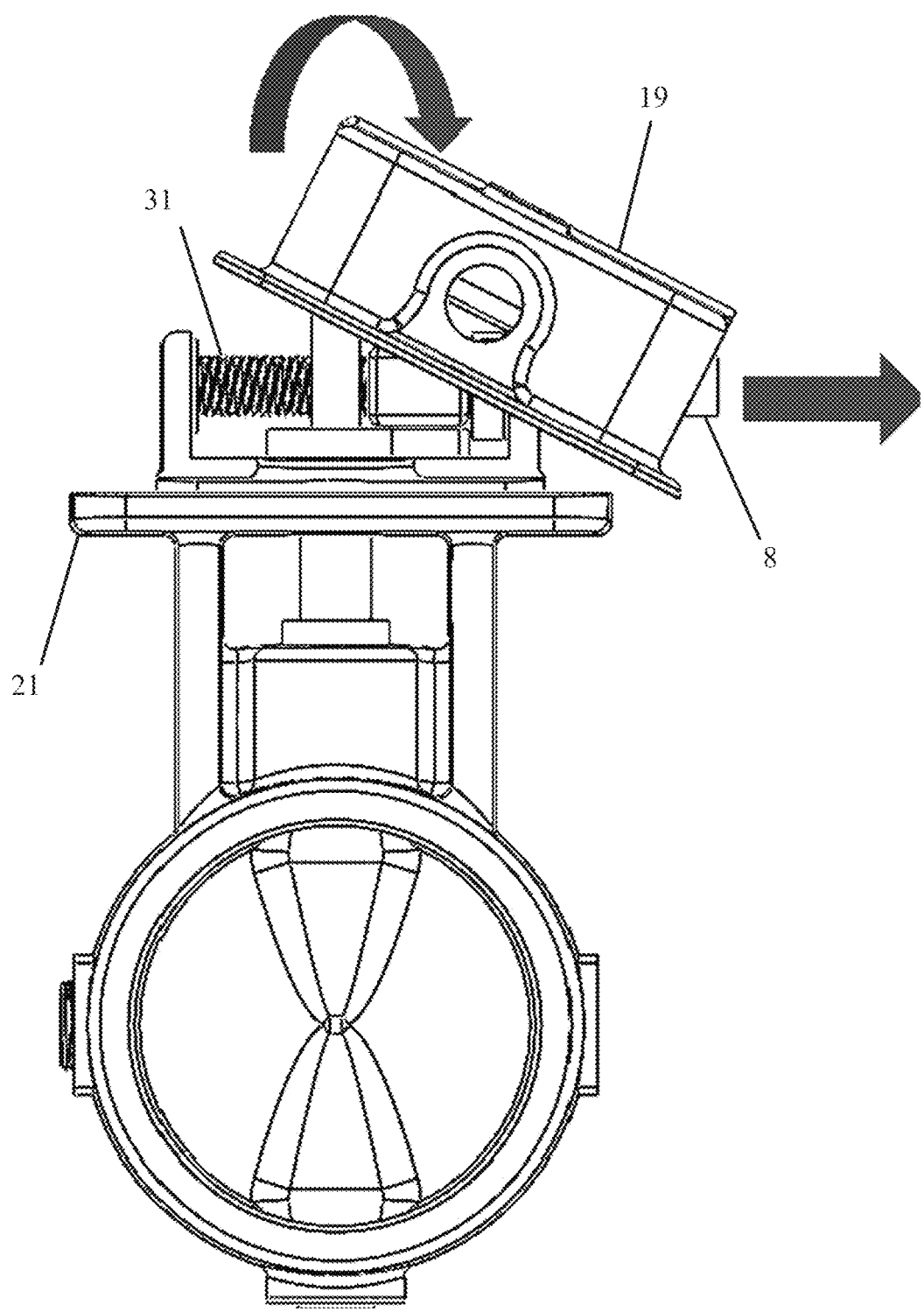
FIG. 8 shows disassembly of an actuator box cover from a butterfly valve, according to the embodiment of FIG. 2.

Referring again to FIGS. 1-5 and also to FIG. 8, which illustrates removal of the actuator box cover 19, the removable actuator box cover 19 can cover the threaded portion 31 of the stem 8, the Scotch yoke actuator 30, the pin nut 7, the limit switch 14, and any other components mounted on or above the platform 21. The actuator box cover 19 has a plurality of sides, including the top side 45 and four perimeter sides 46, which together define an internal cavity 47. The actuator box cover 19 can be shaped alternatively, such that the top side 45 and four perimeter sides 46 can be considered a different number of sides or a one or more rounded or curved sides, to create the internal cavity 47. The internal cavity 47 is sized to house components of the actuator assembly and the valve position indicator assembly. The actuator box cover 19 can relatively easily be fastened and unfastened from the platform 21, such as by tightening or loosening fasteners 54 (e.g., screws) shown in FIG. 2. After unfastening the fasteners, as shown in FIG. 8, the actuator box cover 19 can be tilted at one end. If the handwheel 42 is removed, the actuator box cover 19 can further be slid off the valve stem 8. Because the actuator box cover 19 is detachable from the platform 21 and body 1 rather than integral with the platform 21 and body 1, the actuator box 19 can be classified as a switch cover and the actuator box 19 can allow the butterfly valve 100, 200 to meet the necessary industry standards, including fire ratings, while more easily and inexpensively being fabricated from a machinable, lighter material, such as aluminum. Removal of the actuator box cover 19 also permits much easier access to the components within the internal cavity 47, as opposed to conventional removal of just the top side 45.

As shown in FIG. 1, one of the perimeter sides 46 has a side opening 48, which can be covered by a side plate 10. The side plate 10 has a further opening sized to fit and mount bushing 9. The side plate 10 closes the side opening 48 around the stem 8 or bushing 9. Gasket 20 and o-rings 15, 16, 17 provide a seal against dirt and moisture entry into the actuator box cover 19. While the actuator box cover 19 is removable so that components under the actuator box cover 19 are easily accessible, the side opening 48 and the side plate 10 also provide access without removal of the entire actuator box cover 19.

FIG. 2 shows an alternate side opening 248, which is sized smaller than the side opening 48, to fit the stem 8 and a gasket 220. The gasket seals between the valve stem 8 and one of the perimeter side 46. FIG. 2 also shows an opening 202 and a conduit connector 204 to allow entry/exit of an electrical supply (not shown) or other communication path, to power and/or communicate with the limit switch 14 (FIG. 1).

Figure 9:
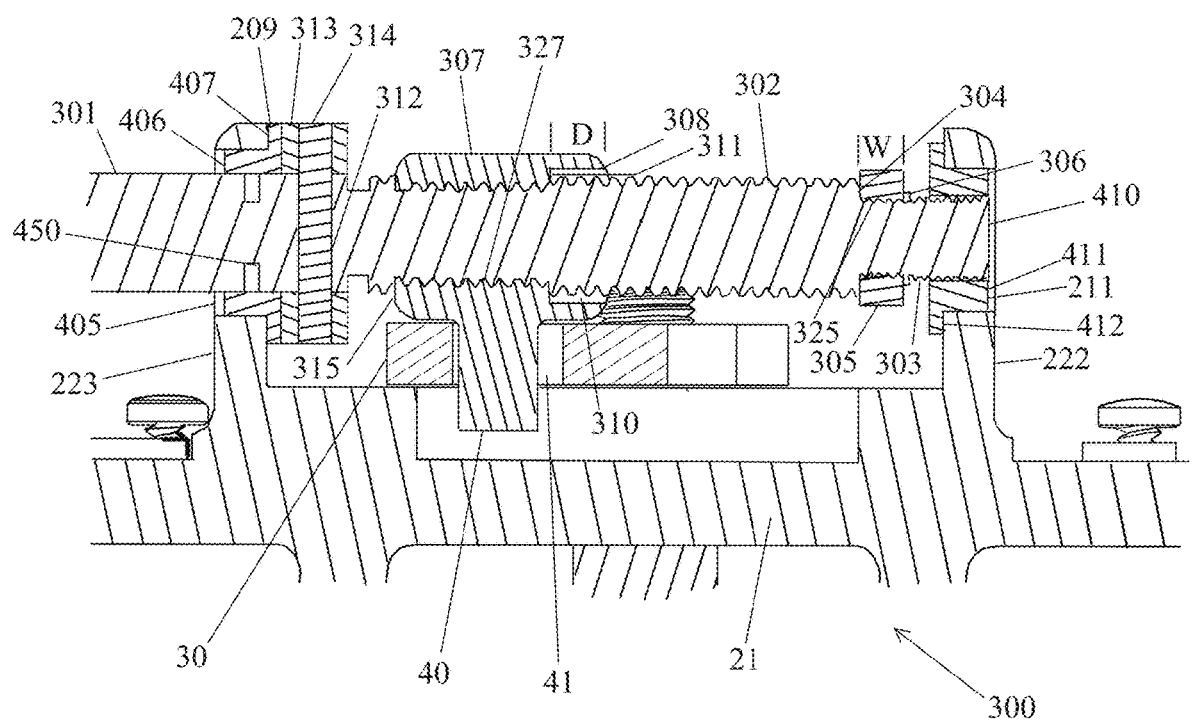
FIG. 9 shows a cross-sectional view of the butterfly valve actuator assembly, according to an embodiment.

In the actuator assembly of FIGS. 1 and 2, the pin nut 7 can be moved along the valve stem 8 to abut and press against the platform supports 22, 23 through bushings 9, 11. Overturning the handwheel 42 or otherwise over-rotating the valve stem 8 can cause damage to the platform supports 22, 23. FIG. 9 shows an alternative embodiment of an actuator assembly 300 that relieves this stress that can be imposed on the platform supports 22, 23.

In this alternative actuator assembly 300, valve stem 301 has a first threaded portion 302 having a first outermost diameter and a second threaded portion 303 having a second outermost diameter. The second outermost diameter is smaller than the first outermost diameter. A shoulder 304 connects the first threaded portion 302 and the second threaded portion 303. The first threaded portion 302 can be at an end of the stem 301 that is proximal to the handwheel 42, while the second threaded portion 303 can be at an end of the stem 301 that is distal to the handwheel 42.

A collar nut 305 having female threads 325 is threadingly engaged with the second threaded portion 303. The collar nut 305 can be positioned to abut the shoulder 304 and can be retained in place by a snap ring 306, which prevents rotation and axial movement of the collar nut 305 along the length of the stem 301. The collar nut 305 has a third outermost diameter greater than the first outermost diameter of the first threaded portion 302.

An alternative pin nut 307 having a pin 40 engages the slot 41 of Scotch yoke actuator arm 30 and a female threaded portion 327 engages the first threaded portion 302 such that rotation of the stem 301 results in linear actuation of the pin nut 307 along a length of the stem 301, moving pin 40 to rotate the Scotch yoke actuator arm 30. The pin nut 307 has a first side 308 facing the collar nut 305. The first side 308 has a recess or opening 310 extending to a depth D defined by a stop surface 311. The recess 310 is large enough to accept the collar nut 305. For example, the recess 310 can be cylindrical in shape, defined by a single circumferential wall having an innermost diameter greater than the outermost diameter of the collar nut 305. Rotating the stem 301 can move the recess 310 around collar nut 305 until the stop surface 311 abuts the collar nut 305 and the pin nut 307 extends around an entirety of the collar nut 305. The depth D of the recess 310 can be approximately equal to a width W of the collar nut 305, such that when the stop surface 311 abuts the collar nut 305, the pin nut 307 extends around an entirety of the collar nut 305. In some embodiments, the collar nut 305 is positioned at a specified distance from the first platform support 22, and the depth D of the recess 310 is no greater than the width W of the collar nut 305 plus the specified distance. Accordingly, when stop surface 311 abuts the collar nut 305, the pin nut 307 does not strike the first platform support 22. Similarly, the depth D of the recess can have a maximum value no greater than a distance from the first platform support 22 to the second externally threaded portion 303, such that when the collar nut 305 abuts the stop surface 311, the pin nut 307 avoids striking the first platform support 22.

The collar nut 305 limits movement of the pin nut 307 in one axial direction of the stem 301. Any additional torque applied to the handwheel 42 to rotate the stem 301 results in the pin nut 307 pressing harder against the collar nut 305, and as such the added stress of the torque is transferred to the pin nut 307 and the collar nut 305 in addition to the threads of the threaded portions 302, 303, 325, 327. In other words, the added stress is isolated and limited to the stem 301 rather than being transferred to the platform 21 supporting the stem 301. The stem 301 and the threads of the stem 301, and the pin nut 307 and the threads of the pin nut 307 are better able to endure this stress without deformation, nonelastic deformation, or shearing.

Referring again to FIG. 9, at an end proximal to the handwheel 42, a lock nut 313 is mounted on the stem 301, such as by a locking pin 314 passing through an opening of the lock nut 313 and an aligned pinhole 312 of the stem 301. The lock nut 313 can be spaced from the bushing 209. The spacing need only be a minimal amount to prevent contact between the bushing 209 and the lock nut 313, to avoid transferring axially directed force of the lock nut 313 to the bushing 209. The stem 301 can be rotated to move a second side 315 of the pin nut 307 toward and into abutment with the lock nut 313, terminating further travel of the pin nut 307 toward the handwheel 42. Any additional rotational force applied to the handwheel 42 to move the pin nut 307 toward the handwheel 42 additionally presses the pin 307 against the lock nut 313. The additional force is absorbed primarily by the locking pin 314, the lock nut 313, and the stem 301, thereby relieving strain on the second platform support 223.

The stem 301 can be supported by the first bushing 209 and the second bushing 211, each being located within a corresponding first opening 405 and second opening 410 of the platform supports 222, 223. Specifically, the first bushing 209 fits first opening 405 and has an inner sleeve 406 sized to fit one side of the stem 301 proximal to the handwheel 42, while the second bushing 211 fits the second opening 410 and has an inner sleeve 411 sized to fit the end of the stem 301 distal to the handwheel 42.

The first bushing 209 has a first bushing flange 407 between the lock nut 313 and the second platform support 223 proximal to the handwheel 42, such that movement of the first bushing 209 is limited by contact of the first bushing flange 407 against the second platform support 223. Similarly, the second bushing 211 has a second bushing flange 412 between the collar nut 305 and the first platform support 222 distal the handwheel 42, such that movement of the second bushing 211 away from the handwheel 42 is limited by contact of the second bushing flange 412 with the first platform support 222.

In the embodiment of FIG. 9, the stem 301 includes a shearing portion 450 configured to be a weak point of the stem 301 that can break when experiencing an amount of shearing force greater than a specified amount. This shearing portion 450 can be located radially inward of the inner sleeve 406 of the first bushing 209, at the end of the stem 301 proximal the handwheel 42. The shearing portion 450 can be a relatively short, reduced-diameter portion, or annular recess in the stem 301. The outer diameter of the shearing portion 450 can be sized as desired such that the shearing portion 450 breaks off when a desired amount of excessive force or torque is applied to the stem 301. The shearing portion 450 is intended to disconnect the handwheel from the remainder of the actuator assembly when force gets large enough that other damage to the actuator assembly would occur otherwise. In particular, when the pin nut 307 is forced against either the collar nut 305 or the lock nut 313 with excessive force, before that force reaches a value that would, for example, damage the pin nut 307, strips the threads of the lock nut 313 and allow the pin nut 307 to press into and damage the platform flange or support 222 distal the handwheel, etc., the shearing portion 450 can shear to disengage the handwheel 42 from the remainder of the stem 301.

In some conventional embodiments, a locking pin is sized relatively small to provide a secondary function as a shearing element, but in the embodiment of FIG. 9, the locking pin 314 is not used as a shearing element such that the locking pin 314 can be sized relatively large to provide structural strength.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A butterfly valve actuator assembly, comprising:
   a platform having a first platform support and a second platform support, the first platform support having a first opening, the second platform support having a second opening;
   a stem extending through the first opening and the second opening, the stem having a first externally threaded portion and a second externally threaded portion, the first externally threaded portion and the second externally threaded portion between the first platform support and the second platform support;
   a pin nut having a body and a pin, the body having a first internally threaded portion threadingly engaged with the first externally threaded portion; and
   a collar nut having a second internally threaded portion threadingly engaged with the second externally threaded portion,
   the body having a recess configured to receive the collar nut.

2. The butterfly valve actuator assembly of claim 1, further comprising:
   a valve shaft with a longitudinal axis; and
   a Scotch Yoke attached to the valve shaft, the Scotch Yoke having a slot configured to revolve around the longitudinal axis with rotation of the valve shaft,
   the pin engaged in the slot.

3. The butterfly valve actuator assembly of claim 1, wherein the stem extends through the recess.

4. The butterfly valve actuator assembly of claim 1, wherein the collar nut is positioned at a first distance from the first platform support in a direction parallel to an axis of the stem, and a depth of the recess is no greater than a width of the collar nut in a direction parallel to the axis of the stem plus the first distance.

5. The butterfly valve of actuator assembly of claim 1, wherein a depth of the recess is no greater than a first distance from the first platform support, in a direction parallel to an axis of the stem, to the first externally threaded portion.

6. The butterfly valve actuator assembly of claim 1, wherein the first externally threaded portion has a first outermost diameter, the second externally threaded portion has a second outermost diameter, and the first outermost diameter is larger than the second outermost diameter.

7. The butterfly valve actuator assembly of claim 1, further comprising a shoulder between the first externally threaded portion and the second externally threaded portion, the collar nut configured to abut the shoulder.

8. The butterfly valve actuator assembly of claim 1, further comprising a snap ring on the second externally threaded portion, the collar nut between the snap ring and the first externally threaded portion.

9. The butterfly valve actuator assembly of claim 1, wherein an outermost diameter of the collar nut is greater than an outermost diameter of the first externally threaded portion.

10. The butterfly valve actuator assembly of claim 1, further comprising a lock nut coupled to the stem between the pin nut and the second platform support.

11. The butterfly valve actuator assembly of claim 10, further comprising a bushing in the second opening, the stem extending through the bushing, the lock nut spaced from the bushing.

12. The butterfly valve actuator assembly of claim 10, wherein the lock nut includes a first pin hole, the stem includes a second pin hole, and the butterfly valve actuator assembly further comprises a pin extending through the first pin hole and the second pin hole.

13. The butterfly valve actuator assembly of claim 10, wherein the stem comprises a shearing portion to a side of the lock nut opposite the pin nut, the shearing portion having a reduced diameter relative to a diameter of the stem adjacent the shearing portion.

14. A butterfly valve actuator assembly, comprising:
   a platform having a first platform support and a second platform support, the first platform support having a first opening, the second platform support having a second opening;
   a stem extending through the first opening and the second opening, the stem having a first externally threaded portion and a second externally threaded portion, the first externally threaded portion and the second externally threaded portion between the first platform support and the second platform support;
   a pin nut having a body and a pin, the body having a first internally threaded portion threadingly engaged with the first externally threaded portion; and
   a lock nut coupled to the stem between the pin nut and the second platform support,
   the stem including a shearing portion to a side of the lock nut opposite the pin nut, the shearing portion having a reduced diameter relative to the stem on either immediately adjacent side of the shearing portion.

15. The butterfly valve actuator assembly of claim 14, further comprising:

a valve shaft with a longitudinal axis; and
a Scotch Yoke attached to the valve shaft, the Scotch Yoke having a slot configured to revolve around the longitudinal axis with rotation of the valve shaft,
the pin engaged in the slot.

16. The butterfly valve actuator assembly of claim 14, further comprising a bushing in the second opening, the stem extending through the bushing, the lock nut spaced from the bushing.

17. The butterfly valve actuator assembly of claim 14, wherein the lock nut includes a first pin hole, the stem includes a second pin hole, and the butterfly valve actuator assembly further comprises a pin extending through the first pin hole and the second pin hole.

18. The butterfly valve actuator assembly of claim 14, further comprising a collar nut having a second internally threaded portion threadingly engaged with the second externally threaded portion.

19. The butterfly valve actuator assembly of claim 18, wherein the body has a recess configured to receive the collar nut.

20. The butterfly valve actuator assembly of claim 18, wherein the first externally threaded portion has a first outermost diameter, the second externally threaded portion has a second outermost diameter, and the first outermost diameter is larger than the second outermost diameter.

21. The butterfly valve actuator assembly of claim 18, further comprising a snap ring on the second externally threaded portion, the collar nut between the snap ring and the first externally threaded portion.

22. The butterfly valve actuator assembly of claim 18, wherein an outermost diameter of the collar nut is greater than an outermost diameter of the first externally threaded portion.

* * * * *